Sept. 22, 1931.         A. J. MEYER         1,824,440
ENGINE CONSTRUCTION
Filed Jan. 20, 1928         2 Sheets-Sheet 1
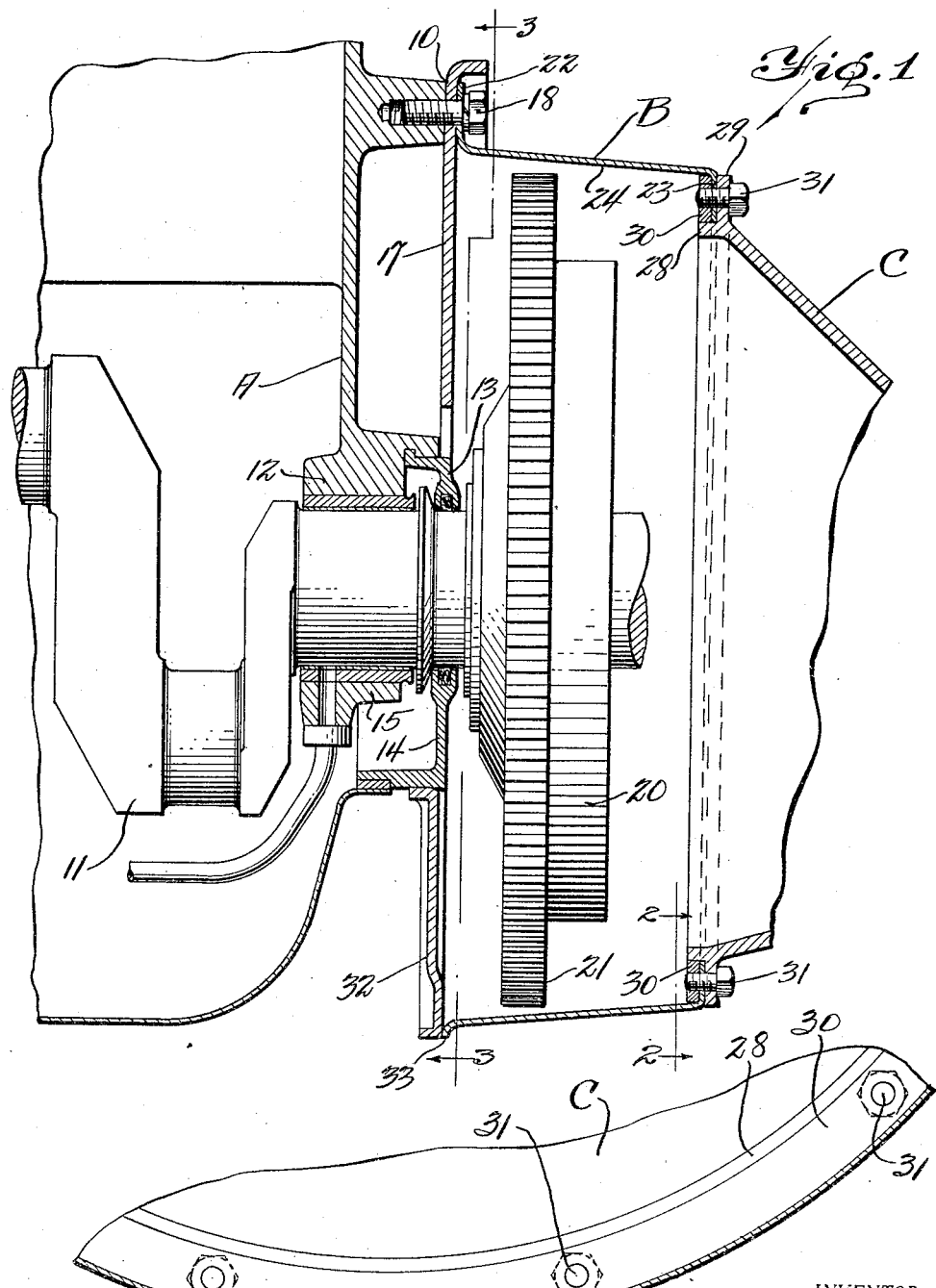
INVENTOR.
Andre J. Meyer
BY
W. W. Harris
ATTORNEY.

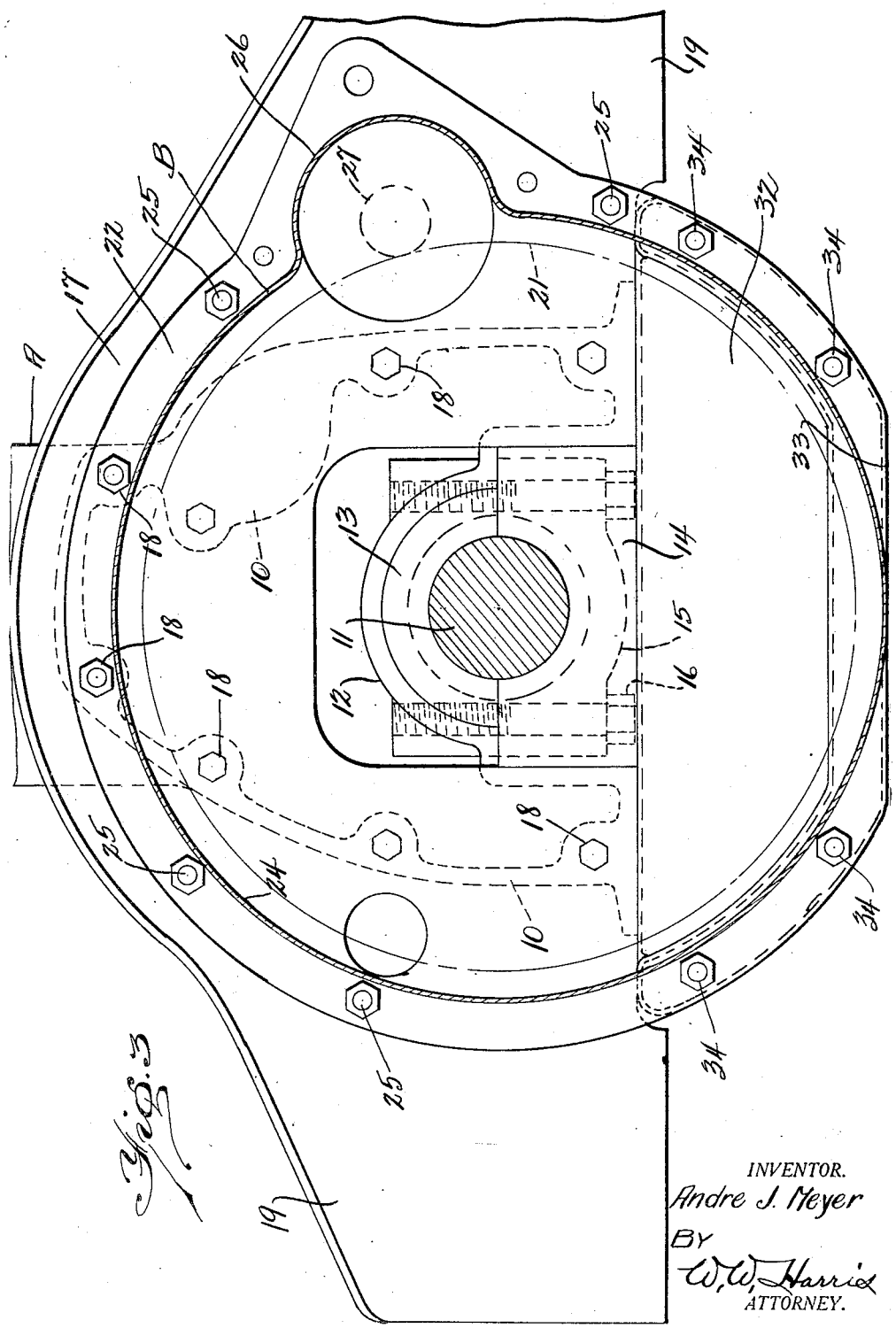

Patented Sept. 22, 1931

1,824,440

UNITED STATES PATENT OFFICE

ANDRE J. MEYER, OF DETROIT, MICHIGAN, ASSIGNOR TO CONTINENTAL MOTORS CORPORATION, OF DETROIT, MICHIGAN, A CORPORATION OF VIRGINIA

ENGINE CONSTRUCTION

Application filed January 20, 1928. Serial No. 248,070.

This invention relates to engine constructions and refers more particularly to an improved engine flywheel housing construction for internal combustion or other engines such as are used for propelling motor vehicles.

One object of my invention resides in providing a flywheel housing construction which in one embodiment of my invention is materially lighter in weight and capable of being manufactured at less cost than corresponding constructions now in general use.

At present flywheel housings are usually constructed of cast metal resulting in a heavy construction which adds materially to the weight of the vehicle in which the engine assembly is installed. Such cast metal housings are machined for fitting to the engine rear end generally to accommodate a transmission housing. Furthermore the conventional cast flywheel housings require securing in place to the engine block rear end prior to assembly of the flywheel, the fasteners being customarily located in such position as not to be readily accessible with the flywheel in assembled position. Where, as in the customary constructions, the flywheel is assembled within the housing after attachment of the housing to the engine block, the housing must necessarily be provided with a rear pilot opening of sufficient diameter to clear the flywheel and starter gear periphery resulting in an excessively large housing with relatively small road clearance (when installed in a vehicle) and requiring a larger transmisssion housing flange than might otherwise be used.

I have provided a flywheel housing construction which may be cast, in one embodiment of my invention, or which may be formed by stamping or pressing sheet metal. In either instance the housing is arranged more compactly in relation to the flywheel assembly structure, permitting assembly of the flywheel housing after assembly of the flywheel, providing increased road clearance, and affording a pilot for receiving and lining up a transmission housing of smaller size than heretofore required.

My flywheel housing may be formed by stamping or pressing sheet metal in such a manner as to provide a more compact housing assembly, practically eliminating the machining operations usually required in the conventional cast housing, and affording a material reduction in weight. Furthermore my construction provides a pilot for receiving and for lining up the transmission housing of relatively small size and affords relatively great road clearance.

Further objects and advantages of my invention will be apparent from the following description illustrative of my invention.

In the drawings,—

Fig. 1 is a sectional elevation view through the engine rear showing the flywheel and transmission housing;

Fig. 2 is a detail sectional view of the housing pilot construction along 2—2 of Fig. 1, and Fig. 3 is a sectional elevation view through the flywheel housing looking toward the engine rear, along 3—3 of Fig. 1.

Referring to the drawings reference character A represents the rear end of an engine body of usual or other preferred construction having a machined face 10 usually extended or projected rearwardly from the engine body as shown in Figs. 1 and 3. The engine crankshaft 11 has an end extended through the engine rear bearing 12 usually sealed against escape of oil by the complementary upper and lower oil sealing plates 13, and 14. The rear bearing 12 has a cap 15 secured to the main bearing portion by the bolts 16.

For supporting the rear end of the engine, as in the vehicle chassis, I have provided a supporting plate 17 which may be positioned against the face 10, being secured thereto by a series of studs 18 spaced around the machined face. The plate 17 has transverse arms 19 for attachment to the supporting structure such as the vehicle chassis frames (not shown).

Mounted on the crankshaft rear end is the usual flywheel 20 which may be provided with the usual gear band 21 for engagement with the pinion of the starter mechanism according to standard practice. For housing the flywheel I have provided a housing member B formed of a metal stamping or pressing or by casting as aforesaid. This housing member is formed with a front outwardly projecting flange 22 and a rear inwardly projecting annular flange 23, the intermediate portion 24 preferably, though not necessarily, sloping inwardly rearwardly for convenience in removal from the stamping dies when formed of sheet metal and to provide a compact housing, the portion 24 clearing the flywheel 20 and gear 21. The housing B is secured in position by fasteners 25 passing through the flange 22 and plate 17, certain of the studs 18, as shown in Figs. 1 and 3, preferably passing through the flange 22 and plate 17 whereby the housing B is secured to both the plate 17 and the engine body A. The housing B may have a depression 26 for accommodating and housing the usual starter mechanism, the starter pinion being diagrammatically illustrated at 27.

The annular flange 23 provides a pilot for receiving and lining up the transmission housing C. Thus the latter housing is provided with the annular pilot 28 adapted to be positioned within the opening provided by the flywheel housing flange 23, a transmission housing flange 29 having contact with the rear annular face of flange 23. For securing the housings B and C together where the housing is formed of sheet metal I have provided an annulus 30 preferably welded to the front annular face of flange 23 and formed with threaded openings for receiving the studs 31. The annulus 30 provides sufficient material for threading and also stiffens the pilot flange 23, insuring proper lining up of the transmission with the flywheel housing and crank-shaft axis. Where the housing B is cast the pilot flange may be cast integrally as will be readily understood.

In order to close the opening to the flywheel housing below the plate 17 I provide a sheet metal dust cover plate 32 engageable along its top beneath the oil sealing plate 14, engine block A, and plate 17, as shown in Fig. 3. The flange 22 at the bottom is preferably cut off or omitted in forming the housing, as at 33 to provide additional road clearance for the vehicle carrying the engine structure. For supporting the dust plate 32 in position, the studs 34 are provided, these studs engaging the flange 22.

From the foregoing it will be apparent that the housing B is compactly arranged about the flywheel, excessive clearance being avoided which results in a lighter housing and affords additional road clearance. Furthermore, the housing B may be assembled after locating the flywheel assembly structure in position, the pilot flange 23 not being required to be of excessive diameter to permit insertion of the flywheel therethrough. In addition the transmission housing may be of a smaller size, consequently lighter and cheaper. The omission of the flange 22 as at 33 provides for road clearance in addition to that afforded by the compact housing structure as generally described and illustrated.

What I claim as my invention is:

1. An engine construction comprising in combination with an engine and crankshaft having a flywheel mounted thereon, a housing structure for the flywheel comprising a pressed sheet metal body portion and engine supporting means associated with the housing structure extending laterally thereof.

2. In combination with an engine and flywheel, a plate fastened to the engine end adjacent the flywheel for supporting the engine, a sheet metal flywheel housing member secured to the supporting plate, said housing member extending rearwardly of the engine and supporting plate and substantially encasing the flywheel.

3. In combination with an engine and flywheel, a plate fastened to the engine end adjacent the flywheel for supporting the engine, a sheet metal flywheel housing member secured to the supporting plate, said housing member extending rearwardly of the engine and supporting plate and substantially encasing the flywheel, and a dust cover plate extending between the housing member and supporting plate.

4. In combination with an engine and flywheel, a plate fastened to the engine end adjacent the flywheel for supporting the engine, a sheet metal flywheel housing member secured to the supporting plate, said housing member extending rearwardly of the engine and supporting plate and substantially encasing the flywheel, and a dust cover plate extending between the housing member and supporting plate, said dust cover plate lying substantially in the plane of the supporting plate.

5. An engine flywheel housing assembly comprising in combination an engine body having its rear end formed with a rearwardly extended projection, a flywheel positioned rearwardly of the engine, an engine supporting plate intermediate the flywheel and engine projection, means securing the supporting plate to said engine projection, a flywheel housing member secured to the plate and extending rearwardly therefrom to substantially encase the flywheel.

6. An engine flywheel housing assembly comprising in combination an engine body having its rear end formed with a rearwardly extended projection, a flywheel positioned rearwardly of the engine, an engine supporting plate intermediate the flywheel and engine projection, means securing the supporting plate to said engine projection, a flywheel housing member secured to the plate and extending rearwardly therefrom to substantially encase the flywheel, and a dust cover plate between the housing member and supporting plate.

7. An engine flywheel housing assembly comprising in combination an engine body having its rear end formed with a rearwardly extended projection, a flywheel positioned rearwardly of the engine, an engine supporting plate intermediate the flywheel and engine projection, means securing the supporting plate to said engine projection, a flywheel housing member secured to the plate and extending rearwardly therefrom to substantially encase the flywheel, said rearwardly extended portion terminating in an annular flange adapted to pilot a transmission housing.

8. An engine flywheel housing assembly comprising in combination, an engine having a flywheel structure adjacent the rear end thereof, a housing element for the flywheel, flanged means on the forward end of said housing element for attachment with the engine rear end, said housing element having a rearwardly extending substantially cylindrical body portion closely adjacent the periphery of the flywheel structure and terminating in an annular flanger portion of less inside diameter than the outside diameter of the flywheel structure, the said flanged means on the forward end of the housing extending outwardly from the housing.

In witness whereof, I hereunto subscribe my name this 13th day of January, A. D. 1928.

ANDRE J. MEYER.